United States Patent [19]
Zermeno et al.

[11] 4,085,324
[45] Apr. 18, 1978

[54] IMAGING BY POINT ABSORPTION OF RADIATION

[75] Inventors: Alfonso Zermeno; Lee M. Marsh, Jr.; James M. Hevezi, all of Houston, Tex.

[73] Assignee: The University of Texas, Houston, Tex.

[21] Appl. No.: 756,634

[22] Filed: Jan. 4, 1977

Related U.S. Application Data

[63] Continuation-in-part of Ser. No. 601,233, Aug. 1, 1975, abandoned.

[51] Int. Cl.² ............................................. G03B 5/17
[52] U.S. Cl. ............................ 250/320; 250/315 A
[58] Field of Search ............... 250/320, 323, 482, 514, 250/503, 315

[56] References Cited

U.S. PATENT DOCUMENTS

| 1,865,441 | 7/1932 | Mutscheller | 250/505 |
| 2,900,515 | 8/1959 | Criscuolo et al. | 250/315 A |
| 3,263,079 | 7/1966 | Mertz et al. | 250/320 |
| 3,412,246 | 11/1968 | Horwitz | 250/315 A |
| 3,801,785 | 4/1974 | Barrett | 250/320 |
| 3,860,817 | 1/1975 | Carmean | 250/320 |

OTHER PUBLICATIONS

"An Investigation of the Inverse Pinhole Camera" Ronald Cowart, Thesis from University of Texas, June 1976.

Primary Examiner—Bruce C. Anderson
Attorney, Agent, or Firm—Arthur M. Dula; Murray Robinson; Ned L. Conley

[57] ABSTRACT

Radiation is partially blocked by a pointlike absorber to establish a patterned flux whose intensity distribution is a function of source geometry. The flux strikes a receptor having a proper contrast to spatial frequency characteristic to map an image that is topologically equivalent to the source at an acceptable level of contrast and acuity.

Apparatus is disclosed that is capable of practicing the invention in the X-ray and light regions of the electromagnetic spectrum.

8 Claims, 9 Drawing Figures

IMAGING BY POINT ABSORPTION OF RADIATION

CROSS REFERENCE TO RELATED APPLICATIONS

The present application is a continuation-in-part of applicant's prior application Ser. No. 601,233, filed Aug. 1, 1975, which has been abandoned.

BACKGROUND OF THE INVENTION

1. Field of the Invention

The present invention is related to methods and apparatus for producing an image and more especially related to methods and apparatus for producing images of X-ray focal spots by point absorption of radiation.

2. Background of the Prior Art

Aristotle discovered the "pinhole" camera when he noted that the sun's image remains round when it enters a darkened room through a rectangular hole. He was unable to account for this phenomenon, but later researches learned that radiation propagates in straight lines thus allowing a small opening to pass radiation selectively and reproduce an image. The image reproduced by a conventional pinhole camera is topologically similar to (i.e. has the same shape) as the object it represents. The image of a conventional pinhole camera also reproduces the color hue and intensity of the original object.

The topological similarity of the image and object is a result of the size and placement of the pinhole. As the pinhole is made smaller, the image gains detail because smaller portions of the object are discretely mapped onto the image. The size of the image is determined by the pinhole's location between the object and image. If the pinhole is located halfway between the image and the object, then the image will be the same size as the object. If the pinhole is placed otherwise, then the relationship between the object size and the size of the image will vary accordingly to well known laws of geometrical optics. The image will be distorted if the pinhole is not located on the axis normal to the image plane running directly between the object and the image. This distortion is well understood by those skilled in the art of geometrical optics. However distorted, large or small the image may become, it remains topologically equivalent to the object. The particular homeomorphic transformation worked on the image is a function of pinhole placement between the object and image while the resolution of the image is a function of pinhole size.

In contrast to the topological information about the object determined by pinhole location and size, the color hue and intensity of the image formed by a pinhole camera are a function of frequency and power density, respectively, of the radiation passing through the pinhole.

The major drawback to the pinhole camera is the fact that a very small hole must be used to obtain a useable image. This in turn limits the amount of radiation that can be passed to the image in a given time. Pinhole cameras, thus, are very slow and possess very high focal ratios. The focal ratio is the ratio of the diameter of the pinhole to the distance between the back of the pinhole and the front of the image plane. In a typical pinhole camera this ratio will be at least 1 to 100.

This high focal ratio also gives the pinhole camera its major advantage. The higher the focal ratio, the greater the depth of the field of the camera. Thus pinhole cameras have very great depths of field and will reproduce a sharp image of an object over a wide range of distances. This property was used to advantage during the recent skylab space project when a television equipped pinhole camera was used to guide the astronauts in docking their spacecraft.

Another advantage of the pinhole camera is that it can produce an image using a wide range of different types of radiation. A conventional lens system depends on the refraction of radiation to form an image. This works fine for light and frequencies in the infrared and ultra violet that are near light in the electromagnetic spectrum. Unfortunately, it is very difficult to refract higher energy radiation such as X-rays, gamma rays, or particulate radiation such as electrons, protons and neutrons. A pinhole camera, however, produces an image by selective transmission of radiation and thus operates just as well with X-rays or particulate radiation as with light. Because of this quality the pinhole camera principal has found great utility in work with X-rays and neutron radiography.

X-rays are generally produced by impinging high energy electrons on a metal target. The quantum properties of the target's metal atoms determine the frequency of the resulting X-rays. It is normal practice to focus the electron beam onto a small spot on the target tube to give the X-rays a pointlike source. This spot is called the "focal spot" of the X-ray tube and its geometry is of interest to persons skilled in the art of radiology.

Pinhole cameras have long been used to examine the size and shape of X-ray tube focal spots. Unfortunately, this technique has a serious drawback. The intense beam of electrons striking the focal spot produces heat that can damage the X-ray tube. The pinhole camera, as discussed above, requires a long or powerful exposure. The tube must thus be operated at high power levels or for a long period of time, or both, to obtain an adequate image. This method of operation limits the life of the X-ray tube and increases the probability of causing an "observer effect," i.e. of so changing the focal spot during the pinhole camera exposure that the data obtained from the image is not accurate after the picture has been taken.

A more detailed understanding of the role of these minute focal spots and their imaging by pinhole cameras may be had by reading Eric Milne's article *The Role of Minute Focal Spots in Roentgenology with Special Reference to Magnification*, in the May 1971 issue of CRC CRITICAL REVIEWS IN RADIOLOGICAL SCIENCES, which is herewith incorporated by reference.

SUMMARY OF THE INVENTION

The present invention is a point absorber camera that produces a negative image by replacing the pinhole in a pinhole camera with a point absorber.

As a pinhole camera operates by selectively passing the light from an object to form an image, so the present invention operated by selectively absorbing radiation to form a negative image while passing all other radiation. As the image in the present invention is produced by removing a small patterned quantity of radiation from the image plane, the present invention yields a camera that has all the advantages of a pinhole camera, i.e. depth of field and useability with both electromagnetic and particulate radiation, without requiring a long or powerful exposure.

The present invention can work with radiation of any de Brogile wavelength and is subject to the same laws of geometrical optics that were mentioned above with respect to the pinhole camera.

An exhaustive study of the geometrical optics of the present invention has been made by Ronald W. Cowart in his thesis entitled "An Investigation of the Inverse Pinhole Camera " (published June 1976) (hereinafter "Thesis") available from the Department of Experimental Radiology, M. D. Anderson Hospital, Houston, Tex. Mr. Cowart's Thesis is incorporated by reference into this application. It is pertinent to the present invention because it exhaustively treats specific examples in a variety of experimental settings giving details of materials used, optical geometry and image results. This Thesis also works out the theoretical mathematical formulas setting forth the relationships between image structure produced by the present invention and absorber geometry and placement.

DETAILED DESCRIPTION OF THE PREFERRED EMBODIMENT

Figure 1:
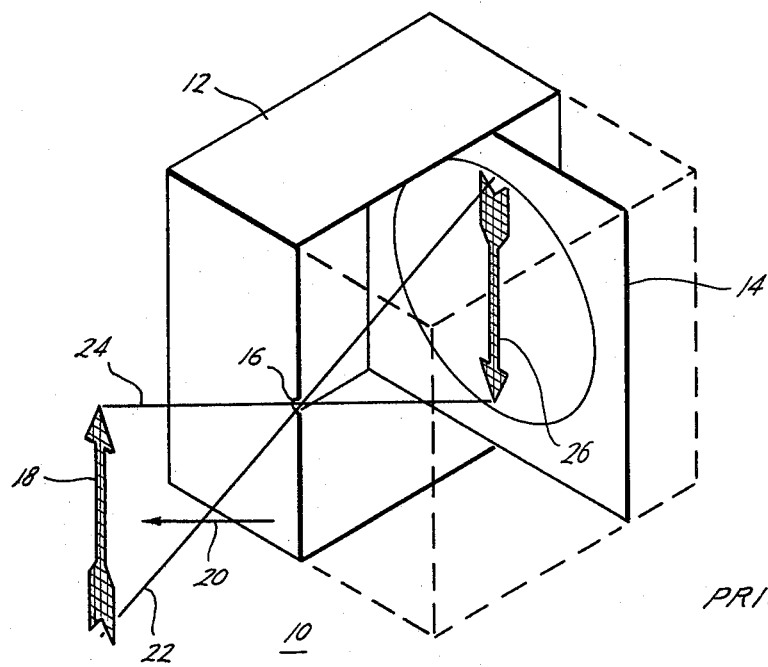
FIG. 1 is a schematic representation of a pinhole camera as taught by the prior art.

Referring to FIG. 1, which represents schematically a pinhole camera constructed according to the prior art, camera 10 has a darkened enclosure 12 and an image plane 14. At one end of enclosure 12 a pinhole 16 is provided facing an object 18.

Functionally, light 20 from any convenient source, not shown, reflects off object 18, which is an arrow. Light rays 22 and 24 travel in straight lines through pinhole 16 to map an image 26, which is an inverted arrow, onto image plane 14. Each point on the object produces a beam of light that is mapped through the pinhole to produce a portion of the image. As was discussed above, the size and distortion of the image is determined by the location of the pinhole with respect to the image plane, the resolution of the image is determined by pinhole size, and the color and intensity of the image depend on the frequency and flux of the radiation passing through the pinhole.

For more details on the geometrical optics of pinhole cameras, see Otto Bluh, *Principles and Applications of Physics*, Oliver Boyd, 1955, page 152 et seq.

Figure 2:
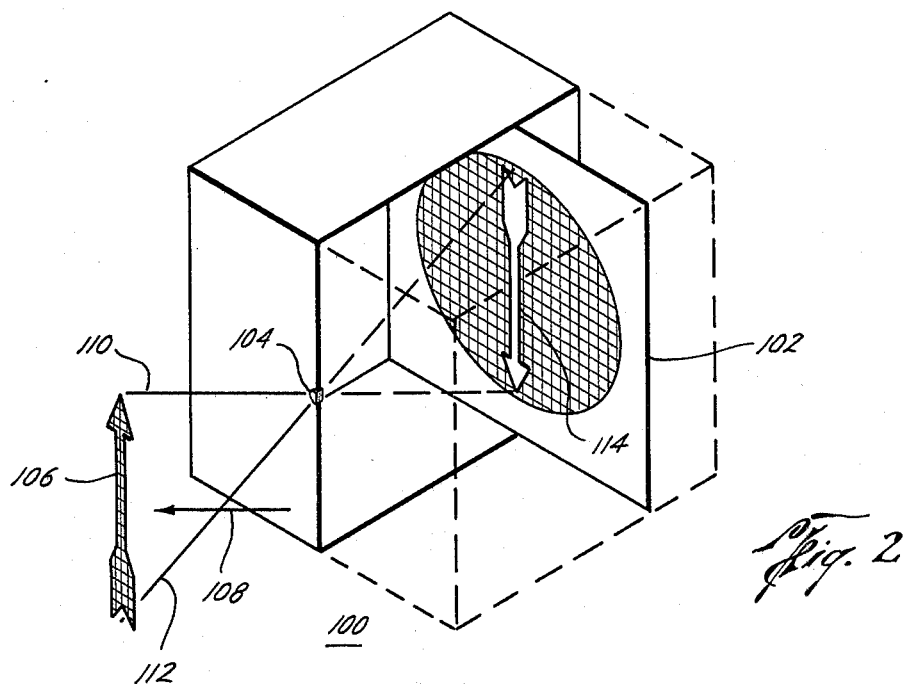
FIG. 2 is a schematic representation of a point absorber camera as taught by the present invention.

FIG. 2 illustrates schematically the present invention in terms similar to those used in FIG. 1.

Camera 100 comprises image plane 102 and point absorber 104. Object 106, which is an arrow, is on the opposite side of the point absorber from the image plane. Incident light 108 is produced by any convenient source, not shown. Light, or any other radiation 108 is reflected by object 106 and rays 110 and 112 are selectively absorbed by point absorber to produce image 114, which is a negative image of an inverted arrow. The image is negative because it is formed by an absence of the radiation that was absorbed by the point absorber. As in a pinhole camera, the distortion and size of the image in the present application is a function of the placement of the absorber relative to the image plane. As in the pinhole camera, the inverse pinhole requires a focal ratio, i.e. a ratio of absorber size to absorber image plane distance, of at least 1 to 100.

Functionally, and more abstractly, the incident light reflected from the object (or the light from the subject if it is self luminous) establishes a flux of radiation. This flux is modulated by the point absorber to produce a patterned flux between the absorber and the image plane that contains information related to the geometry of the object. Specifically, the relative minima in the flux carry this information.

Because all points on the object emit radiation in all directions toward the image plane and the point absorber intercepts only a few specific rays, the minimums in the flux will only be minimums relative to the average flux. Thus the image plane must be provided with some means of detecting and recording these relative minimums before they are swamped by other radiation at the image plane.

Figure 3:
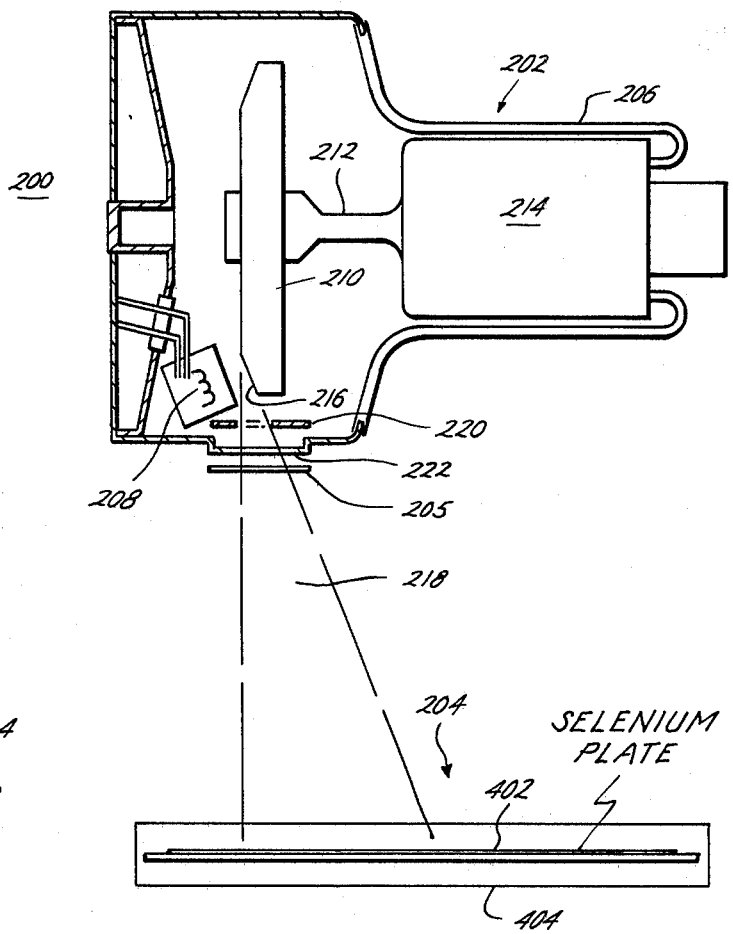
FIG. 3 is a schematic represenation of a preferred embodiment of the present invention operating in the X-ray region of the spectrum.

FIG. 3 shows diagrammatically an apparatus capable of practicing the preferred embodiment of the present invention in the X-ray region of the electromagnetic spectrum.

In FIG. 3 point absorber camera 200 broadly comprises X-ray beam source 202, point absorber matrix 203 and recording system 204.

The X-ray beam source is an X-ray tube having a gastight envelope 206, a cathode 208, and anode 210 attached to shaft 212 which operably engages motor 214. Anode 210 has an annular face 216. X-ray beam 218 passes through collimator 220 and window 222 before striking absorber matrix 203 and recording system 204. The tube 202 is preferably a Siemens "MAMMOMAT" X-ray tube such as is found in the Siemens Mammomat unit model No. 720–01 at the M. D. Anderson Hospital in Houston, Tex.

The advantages of using a Xeroradiography system, including edge enhancement of X-ray images, are well known to those skilled in the art of radiography. For a readable and detailed background of the art in this area see J. W. Boag's article "Xeroradiography", Phys. Med. Biol., 1973, Vol. 18, No. 2, pages 3–37, which is hereby incorporated by reference into this specification.

Basically the Xerox process is very good at recording edges because of the change in the electric field of the selenium recording plate at these points, but it loses detail within an equal density mass within the X-ray image. The effect is known as edge enhancement and will be further described below.

Referring again to FIG. 3, cathode 208 produces a beam of electrons that impinge as a line focus on step 216 of anode 210. This line focus, when viewed from image plane 204 appears to be a focal spot approximately 6 × 6 mm square.

Matrix 205 is approximately 12 inches from the focal spot and recorder 204 is approximately 40 inches from the matrix. Recorder 204 comprises a standard Xeroradiographic plate 402 in a light-tight cassette 404.

Under the above conditions, when a 90 kilovolt electron beam stikes the anode for 5 milliamp seconds, the Xeroradiographic plate will reproduce an image of the focal spot for each point absorber in the matrix.

Functionally the preferred embodiment of the present invention illustrated in FIG. 3 operates as follows X-ray from the focal spot strike a point absorber and create a patterned flux in the field under the absorber. This patterned field carries information about the geometry of the focal spot, as was described above, in its relative minima. When this flux of X-rays interacts with the charged selenium Xeroradiography plate in the recording system, it discharges the selenium surface everywhere except at the relative minimum loci, which retain their charge. These loci, representing a focal spot geometry, are developed by the Xerox processor as a positive image of the focal spot.

Figure 3A:
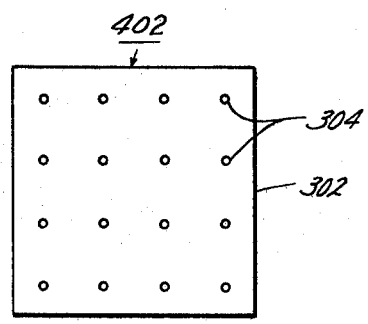
FIG. 3A is a group of point absorbers arranged according to the preferred embodiment of the present invention.

FIG. 3A shows a top view of absorber matrix 402 comprising an aluminum square 302 that is relatively transparent to X-rays and a plurality of regularly distributed point absorbers 304 mounted on square 302, said absorbers being made of tungsten or other material relatively opaque to X-rays.

The point absorbers used in the preferred embodiment of the present invention must be made of a material that is opaque to the radiation carrying the imaging information. Thus an X-ray pinhole camera might have point absorbers made of tungsten or lead while the absorber for visible light could be a spot of opaque paint. Electrons, protons, neutrons and alpha particles could be used in imaging systems employing point absorbers made of any material capable of absorbing the respective radiation. The Thesis incorporated by reference gives several experimental examples.

The diameter of the point absorber will depend on the characteristics desired in the resultant image, the nature and intensity of the imaging radiation, and the optical geometry of the imaging system. A detailed discussion of these considerations, together with several experimental values is given in the Thesis.

Figure 4:
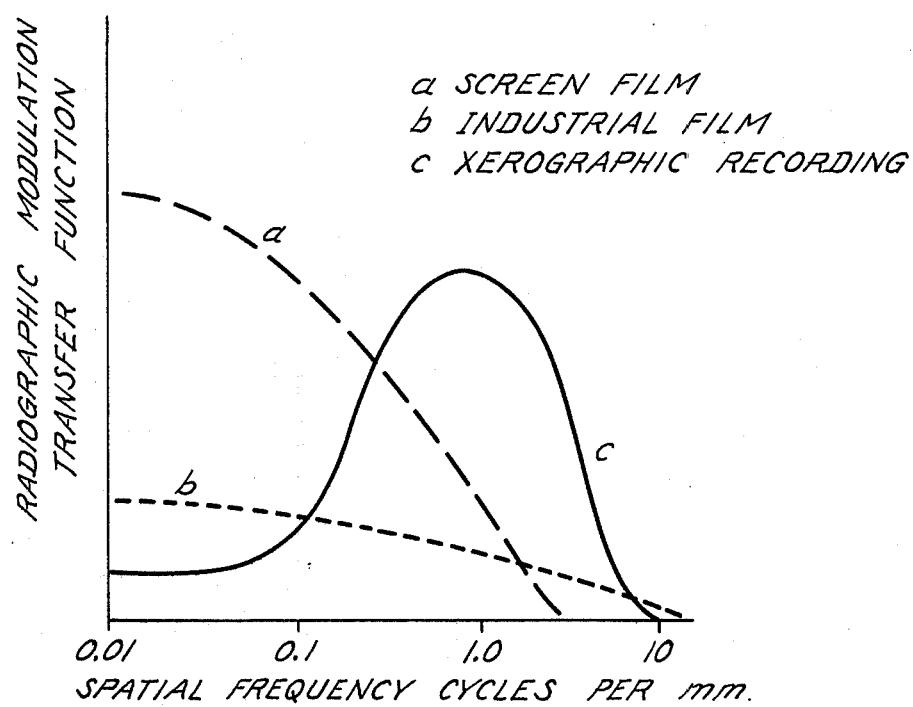
FIG. 4 is a graphic representation of the modulation transfer function of several recording media used with the present invention.

FIG. 4 is a graph of modulation transfer function plotted against spatial frequency for several recording systems. The modulation transfer function is just the ability of an imaging system to record information contained in the X-ray flux. As spatial frequency increases, most recording systems, such as photographic emulsions, are less able to accurately record the flux and have lower modulation transfer functions. Conversely, Xeroradiographic plates record detail better and thus have a higher modulation transfer function as spatial frequency increases to one line per millimeter. This is caused by the electrostatic nature of the system. Electric fields concentrate at edges, giving rise to "edge effects." These edge effects cause the Xerox plate to have a very sharp edge gradient and thus the selenium plate is much better able than film to record the relative minimums in X-ray flux taught by the present invention. Although the Xerox system is preferred in the present embodiment, any recording system that has a high modulation transfer function at high spatial frequency is capable of practicing the present invention.

Figure 5:
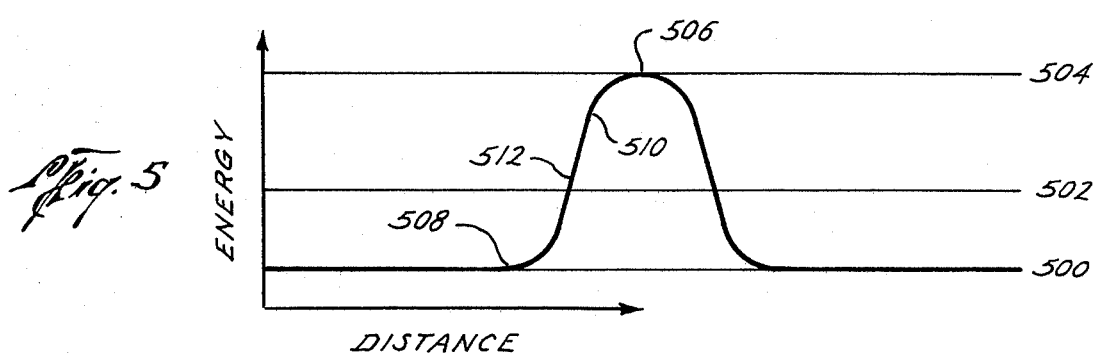
FIG. 5 is a graphic representation of radiation density plotted against locus on the image plane of a pinhole camera.

FIG. 5 shows a diagrammatic cross-section through the radiation flux at the image plane for a pinhole camera as taught by the prior art. Physical locus is on the X axis and power level of the radiation on the y axis. Line 500 is the zero energy line. Line 502 represents the energy threshold required to produce an image on the recording medium beyond which further addition of quanta causes no change in the image.

A pinhole camera selectively admits radiation, thus at the focus 506, where the radiation is admitted there is relative maximum in energy density. At an optimum exposure, the maximum energy density at the image plane is equal to the saturation value of the medium as represented here by line 504. This arrangement results in maximum shadow detail in the recorded image.

The transition between maximum energy of the image and minimum energy occurs between locus 508 and locus 510 at edge 512 of the image. The power density function of this edge always has some slope due to scattering and other sources of radiation incident on the image plane.

In a normal pinhole camera, underexposure results in the loss of information because some of the image remains below threshold 502. Overexposure results in loss of detail because of plurality of points in the image pass the saturation point of the recording medium 504.

Figure 6:
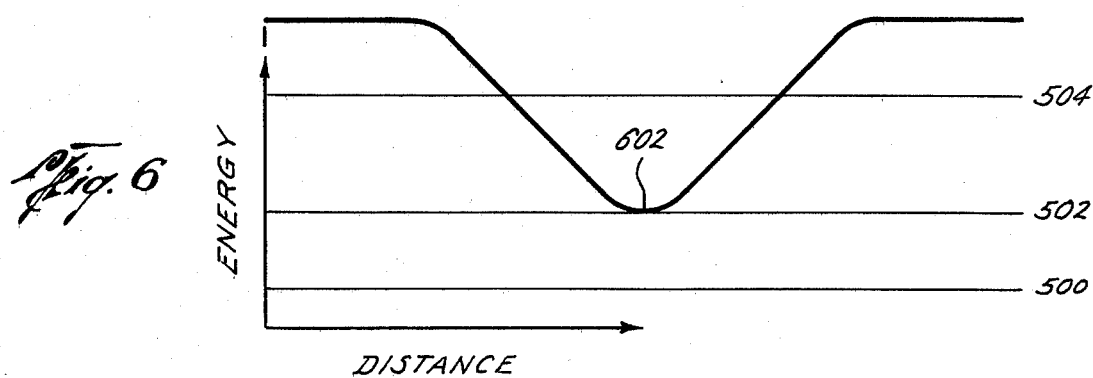
FIG. 6 is a graphic like FIG. 5, but on the image plane of the present invention.

FIG. 6 illustrates the same type of energy per locus diagram as FIG. 5, but for the present invention, a point absorber camera.

As is there shown, the point absorber admits light everywhere except where some rays are absorbed by the point absorber creating a relative minimum at locus 602. In the present invention, a proper exposure results in the lowest point of the minimum lying just below threshold 502 while the average flux is at the saturation level of the recording medium 504. Like a pinhole camera, the present invention's energy flux function has a slope at the edge of the image. But since the present invention results in many more sources of incident light being present at the image plane than the prior art, the energy function edge slope for the present invention will be very much shallower than that of a conventional pinhole camera. When using conventional film, the present invention's shallow edge slope presents a broad edge gradiation to the emulsion's grey scale and this makes the image look blurred. The edge enhancement of a xeroradiographic recording system acts in a fashion similar to the action of a Schmitt trigger in a digital electronic circuit to image everything above a certain power density level at the edge as black while leaving the rest white.

Figure 7:
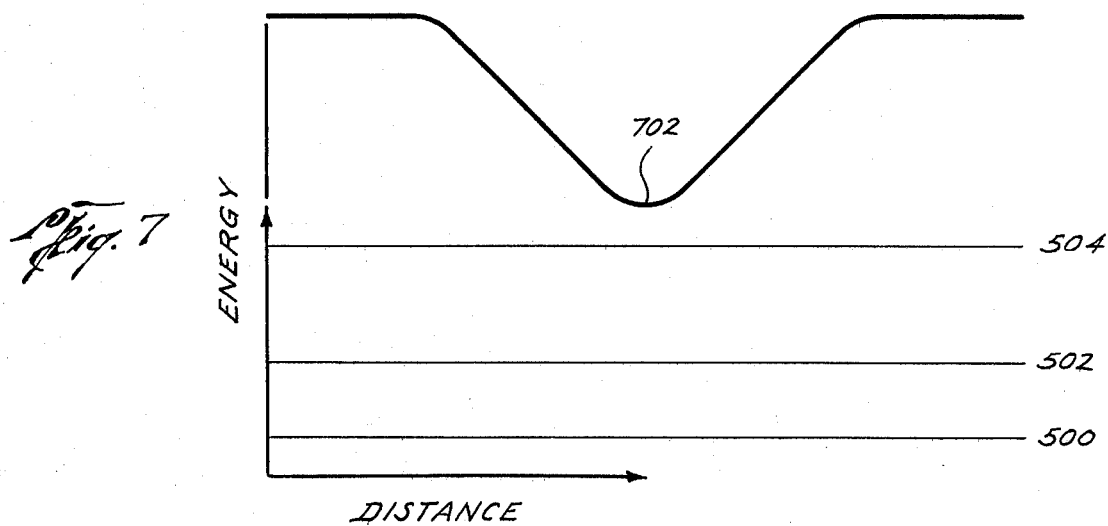
FIG. 7 is a graphic like FIG. 6 only indicating an overexposure according to the present invention.

As is shown by FIG. 7, if overexposure occurs in the present invention, minimum 702 will become greater than the saturation value of the medium 504 and the image will disappear.

Figure 8:
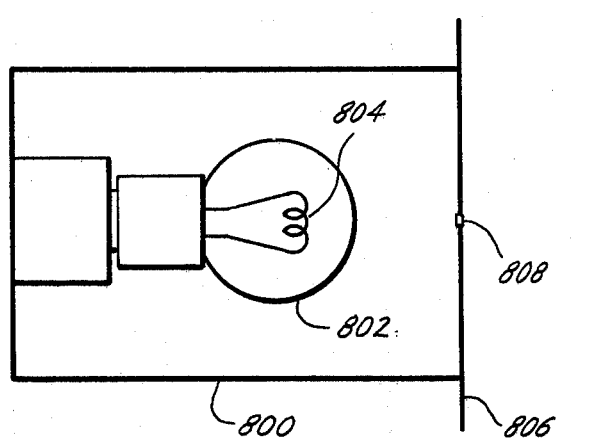
FIG. 8 is a schematic illustration of an apparatus capable of practicing the present invention using an extended object in the visible region of the electromagnetic spectrum.

FIG. 8 schematically shows an apparatus capable of practicing the present invention in the visible light region of the electromagnetic spectrum and of imaging an extended object.

Container 800 contains light source 802 having a luminous filament 804. A piece of glass 806 has a point absorber 808 medially attached between filament 804 and image plane 810.

Functionally, light from the filament is selectively absorbed by the absorber to produce a negative image of the filament on the image plane, which may be a piece of ground glass.

While the above is a preferred embodiment of the invention, it is not intended to be limiting. The point absorber concept as outlined by the following claims and their equivalents may practice the invention in any frequency of the electromagnetic spectrum or for any radiation, i.e. alpha particles, or other particulate radiation, that propagate in straight lines.

We claim:

1. Apparatus for producing an image comprising:
   a source of radiation,
   a receptor responsive to the radiation,
   at least one point absorber located between said source and said receptor not attached thereto, said absorber being opaque to said radiation and small enough to provide a focal ratio of at least 100 to 1.

2. Apparatus as in claim 1 wherein said receptor has a high modulation transfer function at high spatial frequency.

3. Apparatus as in claim 2 wherein said receptor is a Xeroradiographic plate.

4. Apparatus as in claim 2 wherein said receptor is an ionization counter.

5. Apparatus as in claim 1 wherein said radiation is electromagnetic.

6. Apparatus as in claim 1 wherein said radiation is particle radiation.

7. A method of forming a homeomorphic image comprising:
   providing radiation flux from a source having at least one point;
   absorbing a portion of said radiation by at least one point absorber to produce a modulated pattern in said flux that is a function of the geometry of said source;
   sensing the relative minima of the modulated pattern of said flux to produce an image topologically equivalent to said source on a radiation receptor not attached to said absorber.

8. In an apparatus for producing an image containing a source of radiation having a geometry and a receptor responsive to said radiation, the improvement comprising:
   at least one point absorber located between said source and said receptor not attached thereto, said absorber having a mean diameter that is less than 2 percent of the distance from the absorber to the receptor.

* * * * *

UNITED STATES PATENT OFFICE
CERTIFICATE OF CORRECTION

Patent No. 4,085,324            Dated    APRIL 18, 1978

Inventor(s) ALFONSO ZERMENO; LEE M. MARSH, JR.; JAMES M. HEVEZI

It is certified that error appears in the above-identified patent and that said Letters Patent are hereby corrected as shown below:

Column 2, line 60, change "operated" to -- operates --.
Column 3, line 2, change "Brogile" to -- Broglie --.
Column 3, line 27, change "represenation" to
    -- "representation --.
Column 5, line 15, after "follows", insert -- : --.
Column 6, line 27, after "because", delete "of" and
    insert -- a --.

Signed and Sealed this

*Fifteenth* Day of *May 1979*

[SEAL]

*Attest:*

RUTH C. MASON
*Attesting Officer*

DONALD W. BANNER
*Commissioner of Patents and Trademarks*